United States Patent
Lu

(10) Patent No.: US 12,050,378 B2
(45) Date of Patent: Jul. 30, 2024

(54) SPLICING SCREEN AND METHOD OF PREPARING THE SAME

(71) Applicant: TCL CHINA STAR OPTOELECTRONICS TECHNOLOGY CO., LTD., Guangdong (CN)

(72) Inventor: Huajun Lu, Guangdong (CN)

(73) Assignee: TCL China Star Optoelectronics Technology Co., Ltd., Guangdong (CN)

( * ) Notice: Subject to any disclaimer, the term of this patent is extended or adjusted under 35 U.S.C. 154(b) by 0 days.

(21) Appl. No.: 17/790,242

(22) PCT Filed: Jun. 14, 2022

(86) PCT No.: PCT/CN2022/098656
§ 371 (c)(1),
(2) Date: Jun. 30, 2022

(87) PCT Pub. No.: WO2023/216359
PCT Pub. Date: Nov. 16, 2023

(65) Prior Publication Data
US 2024/0176176 A1 May 30, 2024

(30) Foreign Application Priority Data
May 7, 2022 (CN) .......................... 202210492486.X

(51) Int. Cl.
*G02F 1/1333* (2006.01)
*G02F 1/13357* (2006.01)
(Continued)

(52) U.S. Cl.
CPC .... *G02F 1/13336* (2013.01); *G02F 1/133388* (2021.01); *G02F 1/133603* (2013.01); *G02F 1/136222* (2021.01); *G02F 1/1368* (2013.01)

(58) Field of Classification Search
CPC ........... G02F 1/13336; G02F 1/136222; G02F 1/133388; G02F 1/133603
See application file for complete search history.

(56) References Cited

U.S. PATENT DOCUMENTS

2015/0277625 A1 10/2015 Kosugi et al.
2021/0109389 A1* 4/2021 Fan ....................... G02F 1/1362

FOREIGN PATENT DOCUMENTS

| CN | 106249468 | 12/2016 |
| CN | 211654163 | 10/2020 |

(Continued)

OTHER PUBLICATIONS

English translation of CN-112908188-A (Year: 2021).*
(Continued)

*Primary Examiner* — Lucy P Chien
(74) *Attorney, Agent, or Firm* — PV IP PC; Zhigang Ma; Wei Te Chung

(57) ABSTRACT

A splicing screen and a method of preparing the same are disclosed. The splicing screen includes at least two display panels and at least one light board. Wherein, each of the display panels includes a display area and a non-display area; and a splicing area is located between the non-display areas of any two adjacent display panels. Each of the display panels includes a TFT substrate and a color filter substrate. Wherein, the light board is disposed at a same layer as the TFT substrate, located under the color filter substrate, and located in the non-display area and the splicing area.

19 Claims, 2 Drawing Sheets

(51) Int. Cl.
*G02F 1/1362* (2006.01)
*G02F 1/1368* (2006.01)

(56) References Cited

FOREIGN PATENT DOCUMENTS

| CN | 212934616 | 4/2021 |
| CN | 112908188 | 6/2021 |
| CN | 113097276 | 7/2021 |
| CN | 113703211 | 11/2021 |
| CN | 114038340 | 2/2022 |

OTHER PUBLICATIONS

International Search Report and the Written Opinion Dated Dec. 22, 2022 From the International Searching Authority Re. Application No. PCT/CN2022/098656 and Its Translation Into English. (18 Pages).

* cited by examiner

SPLICING SCREEN AND METHOD OF PREPARING THE SAME

RELATED APPLICATIONS

This application is a National Phase of PCT Patent Application No. PCT/CN2022/098656 having International filing date of Jun. 14, 2022, which claims the benefit of priority of Chinese Patent Application No. 202210492486.X filed on May 7, 2022. The contents of the above applications are all incorporated by reference as if fully set forth herein in their entirety.

FIELD AND BACKGROUND OF THE INVENTION

The present application relates to a field of display panels, and more specifically to a splicing screen and a method of preparing the same.

With rapid development of outdoor display markets, large sizes and high resolutions have become development directions of outdoor displays. A traditional LCD has low cost and high resolution. But as a splicing screen, it cannot eliminate splicing seams that affect visual effect. In order to solve this problem, it is usually combined with a mini-LED display technology. A mini-LED light bar covers the splicing seam to realize a zero-seam splicing effect of the LCD, thereby improving a splicing quality. However, this will also create new technical problems, that is, LCD color rendering is RGB color blocks (color filter) filtering different band colors, retaining R, G, B light of corresponding wavelengths, and then mixing the light to form different color to be displayed. The mini-LED light bar excites lights of different wavelengths by epitaxy. Unity in the wavelength of the final light is difficult to achieve for the two. Moreover, the mini-LED light bar covering the splicing seam usually protrudes from the LCD, causing an unsightly appearance.

Embodiments of the present invention provide a splicing screen and a method of preparing the same to solve a problem that a light-emitting wavelength at a splicing seam of a splicing screen and a light-emitting wavelength at a display area are not uniform in the prior art.

SUMMARY OF THE INVENTION

In order to solve the above problem, the embodiments of the present invention disclose the following technical solutions:

In one aspect, a splicing screen is provided that comprises at least two display panels and at least one light board. Wherein, each of the display panels comprises a display area and a non-display area surrounding the display area; and a splicing area is located between the non-display areas of any two adjacent display panels. Each of the display panels comprises a TFT substrate, being disposed in the display area; a color filter substrate, being disposed on the TFT substrate and extending from the display area to the non-display area. Wherein, the light board is disposed at a same layer as the TFT substrate, located under the color filter substrate, and located in the non-display area and the splicing area.

In addition to one or more of the features disclosed above, or alternatively, the light board comprises: a backplate; an LED layer, being disposed on the backplate; a quantum dot layer, being disposed on the LED layer.

The quantum dot layer is disposed on the blue LED layer so that the light board emits white light. Since a spectrum of the white light is similar to a spectrum of a backlight in the display panel, optical properties of the white light from the light board after being filtered by the color filter substrate are close to those of the backlight in the display panel, which is beneficial to splice the display panel and the light board.

In addition to one or more of the features disclosed above, or alternatively, the LED layer comprises a multiple of mini-LEDs disposed at intervals.

In addition to one or more of the features disclosed above, or alternatively, the color filter substrate comprises a multiple of light blocks disposed at intervals, the mini-LEDs are disposed corresponding to the light blocks, an arrangement density of the light blocks on the display panel is same as an arrangement density of the mini-LEDs on the light board.

In addition to one or more of the features disclosed above, or alternatively, there are no shading devices between the light blocks in the non-display area.

In addition to one or more of the features disclosed above, or alternatively, the display panel further comprises a liquid crystal layer, the liquid crystal layer is disposed between the TFT substrate and the color filter substrate.

In addition to one or more of the features disclosed above, or alternatively, the splicing screen further comprises a control device, the control device is electrically connected with the display panels and the light board, and the control device is used for controlling the LED layer to emit light.

In addition to one or more of the features disclosed above, or alternatively, the splicing screen further comprises a control device, the control device is electrically connected with the display panels and the light board and is used for controlling the LED layer to emit light.

In addition to one or more of the features disclosed above, or alternatively, a number of the display panel may also be greater than two, and a number of the light board is correspondingly less than the number of the display panel by one.

In another aspect, a method for preparing the splicing screen involved in the present invention is provided that comprises following steps: preparing at least two display panels; wherein, each of the display panels comprises a display area and a non-display area surrounding the display area, and a splicing area being located between the non-display areas of any two adjacent display panels; preparing at least one light board; assembling the light board to the non-display areas of the display panels and the splicing area between the two display panels. The step of preparing the display panels comprises: preparing a TFT substrate in the display area; preparing a color filter substrate extending from the display area to the non-display area; attaching the color filter substrate to the TFT substrate to form the display panel; wherein, the light board is assembled to a same layer as the TFT substrate.

In addition to one or more of the features disclosed above, or alternatively, the step of preparing the light board comprises: providing a backplate; preparing an LED layer on the backplate; preparing a quantum dot layer on the LED layer.

one technical solution in the above technical solutions has following advantages or beneficial effects: the light board is disposed in the non-display area and the splicing area and located under the color filter substrate. The color filter substrate covers the light board and is used for color filtering the light emitted by the light board to emit red, green, and blue light with wavelengths corresponding to the red, green, and blue light blocks, which have same wavelengths as light emitted by the display panel.

Moreover, the light board and the TFT substrate are disposed at the same layer, and the color filter substrate covers on the light board, so that the user can see that a splicing seam between the display panels is smooth, and an appearance is beautiful.

BRIEF DESCRIPTION OF THE SEVERAL VIEWS OF THE DRAWINGS

The technical solutions and other beneficial effects of the present invention will be apparent through a detailed description of specific embodiments of the present invention with reference to the accompanying drawings.

| reference number: | |
|---|---|
| splicing screen - 100; | display panel - 10; |
| light board - 20; | display area - 101; |
| non-display area - 102; | splicing area - 103; |
| TFT substrate - 110 | color filter susbtrate - 120; |
| liquid crystal layer - 130; | red light block - 121; |
| green light block - 122; | blue light block - 123; |
| backplate - 210; | blue LED layer - 220; |
| quantum dot layer - 230; | blue mini-LED - 221. |

DESCRIPTION OF SPECIFIC EMBODIMENTS OF THE INVENTION

Specific structural and functional details disclosed herein are merely representative and for purposes of describing example embodiments of the present application. But the application may be embodied in many alternative forms and should not be construed as limited only to the embodiments set forth herein.

The technical solutions in the embodiments of the present invention will be clearly and completely described below with reference to the accompanying drawings in the embodiments of the present invention. In description of the present invention, it should be understood that orientation or positional relationship indicated by terms "center", "longitudinal", "lateral", "length", "width", "thickness", "upper", "lower", "front", "rear", "left", "right", "vertical", "horizontal", "top", "bottom", "inside", "outside", "clockwise", "counterclockwise", etc., is based on the orientation or positional relationship shown in the accompanying drawings, which is only for the convenience of describing the present invention and simplifying the description, rather than indicating or implying that the referred device or element must have a specific orientation, be constructed and operated in the specific orientation. Therefore, it should not be construed as a limitation of the present invention.

Figure 1:
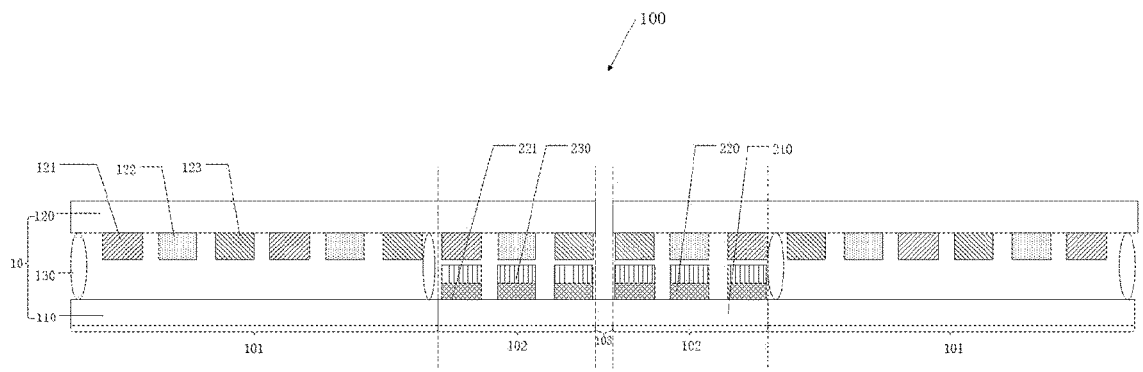
FIG. 1 is a schematic structural diagram of a splicing screen provided by embodiments of the present invention.

Please refer to FIG. 1, FIG. 1 is a schematic structural diagram of a splicing screen 100 provided by the embodiments of the present invention. The splicing screen 100 includes two display panels 10, a light board 20, and a control device (not shown).

In the embodiments, the display panel 10 takes a liquid crystal display panel 10 (LCD) as an example. Each display panel 10 comprises a display area 101, and a non-display area 102 surrounding the display area 101. There is a splicing area 103 between the non-display areas 102 of any two adjacent display panels 10.

Each display panel 10 further includes a TFT substrate 110, a color filter substrate 120, and a liquid crystal layer 130. Wherein, the TFT substrate 110 is disposed in the display area 101.

The color filter substrate 120 is disposed on the TFT substrate 110, and extends from the display area 101 to the non-display area 102. The color filter substrate 120 includes a plurality of red light blocks 121, green light blocks 122, and blue light blocks 123 disposed in an array. The red light blocks 121, the green light blocks 122, and the blue light blocks 123 are disposed at intervals. The red light blocks 121 are used to filter red light. The green light blocks 122 are used to filter green light. The blue light blocks 123 are used to filter blue light.

Wherein, there are no light shading devices between the red light blocks 121, the green light blocks 122, and the blue light blocks 123 of the non-display area 102. In the prior art, metal traces and the light shading devices may be disposed in the non-display area 102 of the display panel 10, but in the present application, the metal traces are disposed under the light blocks to achieve a borderless display effect.

The liquid crystal layer 130 is disposed between the TFT substrate 110 and the color filter substrate 120.

The light board 20 includes a backplate 210, a blue LED layer 220, and a quantum dot layer 230. The backplate 210 adopts a PCB circuit board. The backplate 210 is disposed at a same layer as the TFT substrate 110, and is located in the non-display area 102 and the splicing area 103. In other embodiments, the backplate 210 may also be a glass substrate, which is not limited here.

The blue LED layer 220 is disposed on the backplate 210. The blue LED layer 220 includes a plurality of blue mini-LEDs 221 disposed in an array. The blue mini-LEDs 221 are disposed at intervals. In other embodiments, the blue LED layer 220 may also include a plurality of blue micro-LEDs disposed in an array, which is not limited here.

The blue mini-LEDs 221 are disposed corresponding to the light blocks. An arrangement density of the light blocks on the display panel 10 is same as an arrangement density of the blue mini-LEDs 221 on the light board 20, thereby improving consistency of a transition area between the display panel 10 and the light board 20.

The quantum dot layer 230 is disposed on the blue LED layer 220 so that the light board 20 emits white light. Since a spectrum of the white light is similar to a spectrum of a backlight source in the display panel 10, optical properties of the white light from the light board 20 after being filtered by the color filter substrate 120 are close to optical properties of the backlight source in the display panel 10, which is beneficial to splicing between the display panel 10 and the light board 20. Moreover, the light board 20 adopts a single-color light-emitting device, so characteristics such as electrical curve and life decay are more stable. The characteristics of different color light-emitting devices are different. Therefore, the light board 20 adopts a white light-emitting device to reduce the difficulty of optical debugging.

The light board 20 is located in the non-display area 102 and the splicing area 103, and is located under the color filter substrate 120. The color filter substrate 120 covers the light board 20 and is used for color filtering the light emitted by the light board 20 to emit red, green, and blue light with wavelengths corresponding to the red, green, and blue light blocks, and have same wavelengths as light emitted by the display panel 10.

Moreover, the light board 20 and the TFT substrate 110 are disposed at a same layer, and the color filter substrate 120 covers the light board 20, so that a user can see that a splicing seam between the display panels 10 is smooth and an appearance is beautiful.

The control device is electrically connected with the display panels 10 and the light board 20, and the control device is used for controlling the plurality of blue mini-LEDs 221 to emit light and for controlling the plurality of blue mini-LEDs 221 to display synchronously with a plurality of sub-pixels in the TFT substrate 110, so that the display panels 10 and the light board 20 together display a complete picture. The pictures displayed on an entire splicing screen 100 are integrated, thereby improving look and feel.

Specifically, the display panel 10 further includes a backlight module, which is used for providing the backlight source for the display panel 10. The control device is electrically connected with the backlight module to control the plurality of blue mini-LEDs 221 and a backlight module to emit light at a same time.

In other embodiments, a number of the display panels 10 may also be greater than two, and a number of the light board 20 is correspondingly one less than the number of display panels. The multiple display panels 10 are distributed in array, that is, the multiple display panels 10 may be distributed in multiple rows and one column, or distributed in one row and multiple columns, or distributed in multiple rows and multiple columns. The number and distribution of the multiple display panels 10 can be set according to actual needs.

The splicing screen 100 in the embodiment can be used as a display terminal for radio and television media, big data centers, and the like.

Figure 2:
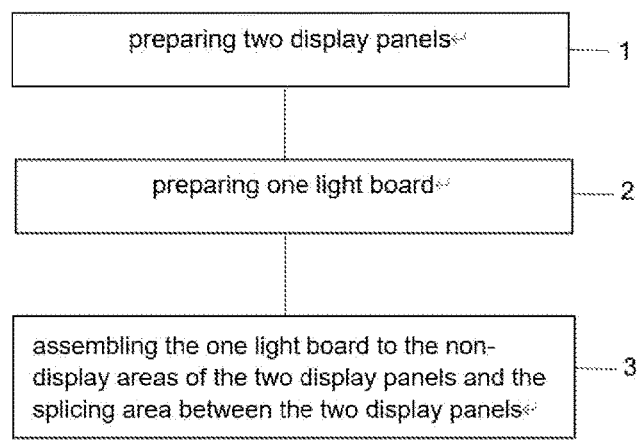
FIG. 2 is a flow chart of a method of preparing the splicing screen provided by the embodiments of the present invention.

The embodiment of the present invention also provides a method for preparing the splicing screen 100 involved in the present invention. Please refer to FIG. 2, FIG. 2 is a flow chart of the preparation method. The preparation method includes Steps 1 to 3.

Step 1: preparing two display panels 10.

Figure 3:
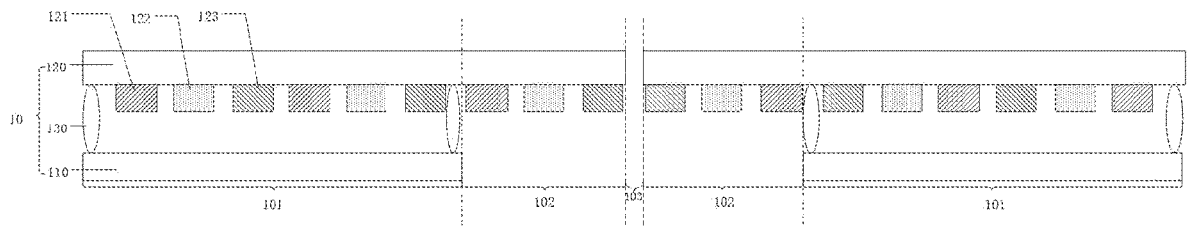
FIG. 3 is a schematic structural diagram of Step 1 of the method of preparing the splicing screen provided by the embodiments of the present invention.

Please refer to FIG. 3, FIG. 3 is a schematic structural diagram of Step 1. Wherein, each display panel 10 comprises a display area 101, and a non-display area 102 surrounding the display area 101. There is a splicing area 103 between the non-display areas 102 of any two adjacent display panels 10.

The step of preparing the display panels 10 includes Steps 11 to 13.

Step 11: preparing a TFT substrate 110 in the display area 101.

Step 12: preparing a color filter substrate 120 extending from the display area 101 to the non-display area 102.

The color filter substrate 120 includes a plurality of red light blocks 121, green light blocks 122, and blue light blocks 123 disposed in an array. The red light blocks 121, the green light blocks 122, and the blue light blocks 123 are disposed at intervals. The red light blocks 121 are used to filter red light. The green light blocks 122 are used to filter green light. The blue light blocks 123 are used to filter blue light.

Step 13: attaching the color filter substrate 120 to the TFT substrate 110 to form the display panel 10.

Specifically, a liquid crystal layer 130 is disposed between the TFT substrate 110 and the color filter substrate 120.

Step 2: preparing one light board 20.

Figure 4:
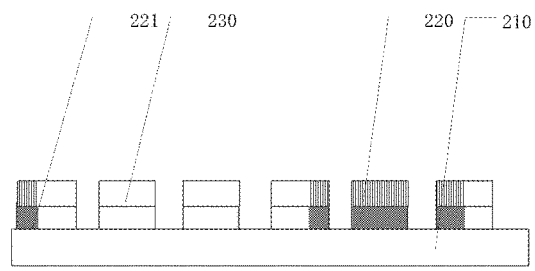
FIG. 4 is a schematic structural diagram of Step 2 of the method of preparing the splicing screen provided by the embodiments of the present invention.

Please refer to FIG. 4, FIG. 4 is a schematic structural diagram of Step 2. The step of preparing the one light board 20 includes Steps 21 to 23.

Step 21: providing a backplate 210.

The backplate 210 adopts a PCB circuit board. In other embodiments, the backplate 210 may also be a glass substrate, which is not limited here.

Step 22: preparing a blue LED layer 220 on the backplate 210.

The blue LED layer 220 includes a plurality of blue mini-LEDs 221 disposed in an array. The blue mini-LEDs 221 are disposed at intervals. In other embodiments, the blue LED layer 220 may also include a plurality of blue micro-LEDs disposed in an array, which is not limited here.

Step 23: preparing a quantum dot layer 230 on the blue LED layer 220.

The quantum dot layer 230 is disposed on the blue LED layer 220 so that the light board 20 emits white light. Since a spectrum of the white light is similar to a spectrum of a backlight source in the display panel 10, optical properties of the white light from the light board 20 after being filtered by the color filter substrate 120 are close to optical properties of the backlight source in the display panel 10, which is beneficial to splicing between the display panel 10 and the light board 20.

Step 3: assembling the one light board 20 to the non-display areas 102 of the two display panels 10 and the splicing area 103 between the two display panels 10.

Figure 5:
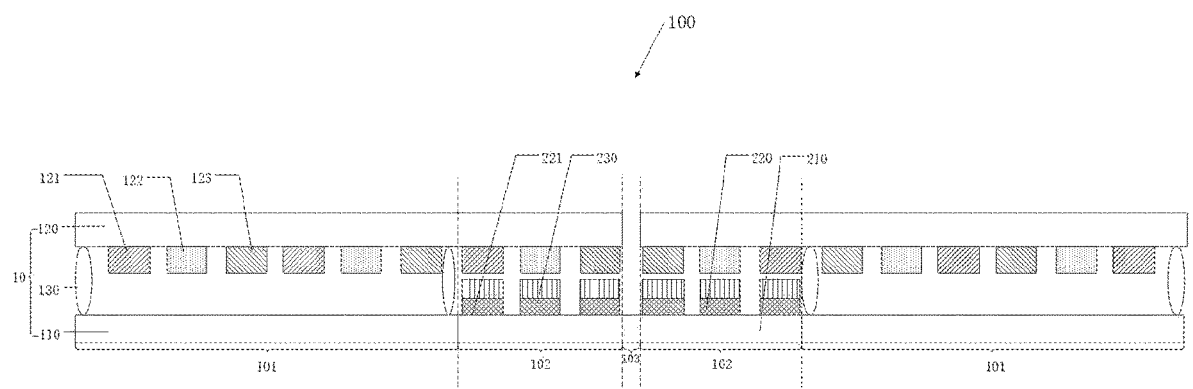
FIG. 5 is a schematic structural diagram of Step 3 of the method of preparing the splicing screen provided by the embodiments of the present invention.

Please refer to FIG. 5, FIG. 5 is a schematic structural diagram of Step 3.

Wherein, the light board 20 is assembled to a same layer as the TFT substrate 110. Specifically, the backplate 210 and the TFT substrate 110 are disposed at a same layer. The light board 20 is located in the non-display area 102 and the splicing area 103 and located under the color filter substrate 120. The color filter substrate 120 covers the light board 20 and is used for color filtering the light emitted by the light board 20 to emit red, green, and blue light with wavelengths corresponding to the red, green, and blue light blocks, and have same wavelengths as light emitted by the display panel 10.

After assembling the light board 20 and the display panel 10, a control device is also prepared. The control device is electrically connected with the display panels 10 and the light board 20, and the control device is used for controlling the plurality of blue mini-LEDs 221 to emit light and for controlling the plurality of blue mini-LEDs 221 to display synchronously with a plurality of sub-pixels in the TFT substrate 110, so that the display panels 10 and the light board 20 together display a complete picture. The pictures displayed on an entire splicing screen 100 are integrated, thereby improving look and feel.

The above is a detailed introduction of the splicing screen and the method of preparing the same provided by the embodiments of the present application. The principles and implementations of the present invention are described herein by using specific examples. The descriptions of the above embodiments are only used to help understand the methods and core ideas of the present invention. Those of ordinary skill in the art should understand that they can still make modifications to the technical solutions described in the foregoing embodiments or perform equivalent replacements to some of the technical features. However, these modifications or replacements do not make the essence of the corresponding technical solutions deviate from the scope of the technical solutions of the embodiments of the present invention.

What is claimed is:

1. A splicing screen, comprising at least two display panels and at least one light board; wherein, each of the display panels comprises a display area, and a non-display area surrounding the display area; and a splicing area located between the non-display areas of any two adjacent display panels; each of the display panels comprising: a thin film transistor (TFT) substrate, disposed in the display area; and a color filter substrate, disposed on the TFT substrate and extending from the display area to the non-display area; wherein, the light board is located under the color filter substrate, and located in the non-display area and the splicing area; wherein the light board is disposed at the same layer as the TFT substrate; the light board comprises: a backplate; a light-emitting diode (LED) layer, disposed on the backplate; and a quantum dot layer, disposed on the LED layer.

2. The splicing screen according to claim 1, wherein the LED layer comprises a plurality of mini-LEDs disposed at intervals.

3. The splicing screen according to claim 2, wherein the color filter substrate comprises a plurality of light blocks disposed at intervals, the mini-LEDs are disposed corresponding to the light blocks, and an arrangement density of the light blocks on the display panel is same as an arrangement density of the mini-LEDs on the light board.

4. The splicing screen according to claim 3, wherein there are no light shading devices between the light blocks in the non-display area.

5. The splicing screen according to claim 1, wherein the display panel further comprises a liquid crystal layer, the liquid crystal layer is disposed between the TFT substrate and the color filter substrate.

6. The splicing screen according to claim 1, wherein the backplate adopts a PCB circuit board.

7. The splicing screen according to claim 1, wherein the splicing screen further comprises a control device, the control device is electrically connected with the display panels and the light boards and the control device is used for controlling the LED layer to emit light.

8. The splicing screen according to claim 1, wherein a number of the light boards is correspondingly less than a number of the display panels by one.

9. The splicing screen according to claim 1, wherein the LED layer comprises a plurality of micro-LEDs disposed at intervals.

10. The splicing screen according to claim 1, wherein the LED layer adopts a blue LED layer.

11. The splicing screen according to claim 7, further comprising a backlight module, the control device and the backlight module are used to control the LED layer and the backlight module to emit light at a same time.

12. A method of preparing the splicing screen according to claim 1, comprising following steps:
preparing the at least two display panels; wherein, each of the display panels comprises the display area, and the non-display area surrounding the display area, and the splicing area located between the non-display areas of any two adjacent display panels;
preparing the at least one light board; and
assembling the light board to the non-display areas of the display panels and the splicing area between the two display panels;
the step of preparing the at least two display panels comprising:
preparing the TFT substrate in the display area;
preparing the color filter substrate extending from the display area to the non-display area; and
attaching the color filter substrate to the TFT substrate to form the display panel.

13. The method according to claim 12, wherein
the step of preparing the at least one light board comprises:
providing a backplate;
preparing an LED layer on the backplate; and
preparing a quantum dot layer on the LED layer;
wherein the light board is assembled to the same layer as the TFT substrate.

14. The method according to claim 13, wherein the LED layer comprises a plurality of mini-LEDs disposed at intervals.

15. The method according to claim 14, wherein the color filter substrate comprises a plurality of light blocks disposed at intervals, the mini-LEDs are disposed corresponding to the light blocks, an arrangement density of the light blocks on the display panel is same as an arrangement density of the mini-LEDs on the light board.

16. The method according to claim 15, wherein there are no light shading devices between the light blocks in the non-display area.

17. The method according to claim 12, wherein the display panel further comprises a liquid crystal layer, the liquid crystal layer is disposed between the TFT substrate and the color filter substrate.

18. The method according to claim 13, wherein the backplate adopts a PCB circuit board.

19. The method according to claim 13, wherein further comprises a control device, the control device is electrically connected with the display panels and the light board, and the control device is used for controlling the LED layer to emit light.

* * * * *